United States Patent [19]

Frenkel et al.

[11] Patent Number: 4,790,616

[45] Date of Patent: Dec. 13, 1988

[54] OPTICAL SEPARATING MODULE

[75] Inventors: Ferdinand Frenkel, Augsburg; Detlef Haberland, Steinebach; Helmut Haltenorth, Munich, all of Fed. Rep. of Germany

[73] Assignee: Siemens Aktiengesellschaft, Berlin and Munich, Fed. Rep. of Germany

[21] Appl. No.: 857,998

[22] Filed: May 1, 1986

[30] Foreign Application Priority Data

May 3, 1985 [DE] Fed. Rep. of Germany ....... 3515981

[51] Int. Cl.[4] .............................................. G02B 6/26
[52] U.S. Cl. .................................. 350/96.15; 350/316
[58] Field of Search ................. 350/96.15, 96.16, 311, 350/313, 316; 370/1, 3

[56] References Cited

U.S. PATENT DOCUMENTS

| | | | |
|---|---|---|---|
| 4,244,045 | 1/1981 | Nosu et al. | 370/3 |
| 4,300,811 | 11/1981 | Ettenberg et al. | 350/1.1 |
| 4,339,170 | 7/1982 | Winzer | 350/96.16 |
| 4,339,290 | 7/1982 | Winzer et al. | 350/96.16 X |
| 4,482,994 | 11/1984 | Ishikawa | 370/3 |
| 4,498,731 | 2/1985 | Winzer et al. | 350/96.15 X |
| 4,589,724 | 5/1986 | Winzer | 350/96.15 |
| 4,637,682 | 1/1987 | Mahlein et al. | 350/96.15 |
| 4,682,843 | 7/1987 | Mahlein et al. | 350/96.15 |
| 4,702,548 | 10/1987 | Tanaka et al. | 350/316 X |

FOREIGN PATENT DOCUMENTS 2509479 1/1983 France .
3229570 2/1984 Fed. Rep. of Germany .

OTHER PUBLICATIONS

Winzer et al, "Single-Mode and Multimode All-Fiber Directional Couplers for WDM", *Applied Optics*, vol. 20, No. 18, Sep. 15, 1981, pp. 3128-3135.
Reichelt et al, "Wavelength-Division Multiplexers for Two-Channel Single-Mode Transmission Systems", *Journal Of Lightwave Technology*, vol. LT-2, No. 5, Oct. 1984, pp. 675-681.
Abstract of Japanese Patent Application 58-169124, *Patent Abstracts of Japan*, vol. 8, No. 6, (P247) (1443) Jan. 12, 1984.
Winzer, "Wavelength-Division Multiplex, a Favorable Principle?", *Siemens Forsch.-u. Entwickl.-Ber.*, vol. 10(1981), No. 6, pp. 362-370.

Primary Examiner—John D. Lee
Attorney, Agent, or Firm—Hill, Van Santen, Steadman & Simpson

[57] ABSTRACT

An optical separating module is provided with both an interference beam-splitter and a filter layer whose transmission characteristics correspond to each other. Both layers are vapor deposited with the filter layer being deposited on the optical fiber end face which is subsequently to be coupled to an optoelectrical transducer forming a receiver.

5 Claims, 4 Drawing Sheets

OPTICAL SEPARATING MODULE

BACKGROUND OF THE INVENTION

In light waveguide communication systems, high exploitation of the transmission capacity of the light waveguide can be achieved in a bidirectional (or unidirectional) wavelength-division multiplex (WDM) in that given a bidirectional wavelength-division multiplex, the light waves having a lower wavelength, for instance, around 830 nm, are employed for the signal transmission in one transmission direction and light waves having a higher wavelength, for instance, in the range of 1300 nm, are utilized for the signal transmission in the opposite or other direction. Appropriate optical separating modules are utilized at both ends of the light waveguide link for separating the two wavelengths and these separating modules are respectively coupled to transmission modules containing electro-optical transducers and to a reception module containing an opto-electrical transducer.

An optical separating module (WDM coupler) which can be a wavelength division multiplexer or demultiplexer can be comprised of a wavelength-selective interference filter or beam splitter layer which is composed of a plurality of layers and which is vapor-deposited onto an oblique end face of an optical fiber in a high vacuum. This beam splitter layer, which lies on a slanting plane, separates two end faces of two mutually aligned optical fibers. An additional optical fiber which will extend obliquely relative to the aligned two optical fibers and has its axis intersecting the common axis of the two waveguides in the plane of the beam-splitting layer is provided to receive light reflected by the beam-splitting layer. Such a device is provided by placing optical fibers in V-shaped grooves of optical or glass members which are joined together, cut, polished and have the beam-splitting layer applied and then are subsequently joined and then separated again to form the various units. Examples of these are disclosed in U.S. patent application Ser. No. 246,100, filed Mar. 20, 1981, which issued as U.S. Pat. No. 4,637,682 on Jan. 20, 1987 and is based on German OS No. 3,012,184. Also, these are disclosed in an article in *Applied Optics,* Vol. 20, No. 18, 1981, pp. 3128–3135.

In order to boost the optical cross-talk attenuation of the separating modules or WDM couplers, discrete band-pass filter laminae are provided at the reception optical fibers (see article from Applied Optics). Filter laminae can also be provided in a corresponding way in a bidirectional light waveguide transmission system which does not have separating modules as disclosed in U.S. Pat. No. 4,300,811, whose disclosure is incorporated by reference.

In a bidirectional light waveguide transmission system comprising two optical separating modules of the above-mentioned type, the transmission module as well as the reception module at the two ends of the light waveguide link can (as indicated in *IEEE Journal of Light Waveguide Technology,* LT-2 1 (1984), October, No. 5, pp. 675–681, particularly in FIG. 1, and as also indicated in French Patent No. 2,509,479, particularly FIG. 2 can be respectively coupled to the same optical fiber of the particular separating modules of the two separating modules. The two separating modules are provided with beam splitters having mutually offset filter characteristics in accordance with the two light wavelengths utilized for the two transmission directions. This enables uniform structure transmit-receive modules to be employed at both ends of the optical transmission link with each module comprising a transmission module, reception module and separating module. A uniform assembly adjustment and other test devices can accordingly be employed in the fabrication of each of these modules.

The optical cross-talk attenuation of, for example, 20 dB achieved with the beam-spiltter layer can be boosted with the assistance of a discrete band-pass filter laminae which is situated in front of the reception module. The insertion of such a filter laminae, however, will entail an insertion attenuation of about 1 dB or more.

SUMMARY OF THE INVENTION

The present invention is directed to an improvement which enables a way of reducing the insertion attenuation and also discloses a simple method for producting the filter.

The invention relates to an improvement in an optical separation module or wavelength division multiplex (WDM coupler) comprising first and second mutually aligned optical fibers separated from one another by a wavelength selective beam-splitter layer arranged at an angle to the common axis as well as an additional or third optical fiber extending at an angle relative to the aligned optical fibers and at an angle of reflection of the beam-splitter layer for light transmitting in the first fiber and having its axis intersecting the common axis at the plane of the wavelength selective beam-splitter layer. The improvement to this optical separating module is that a filter layer having a transmission characteristic corresponding to the transmission characteristic of the beam-splitter layer of the separating module or WDM coupler is applied to the optical fiber end face of the second optical fiber and this end face is coupled to an opto-electronic transducer of the reception module.

Since the separating module or WDM coupler is provided with a filter layer with the filter characteristics at the optical fiber end face, the invention thus yields the advantage that the selectivity of the separating module is boosted without an additional band-pass filter laminae and without the relatively high insertion attenuation of such a filter laminae. As a result of the filter layer, the attenuation of the optical cross-talk can be increased by at least 15 dB wherein the insertion attenuation will be increased by only about 0.1 through 0.4 dB.

In a further development of the invention, the filter layer can be vapor-deposited just like the beam-splitter layer. This advantageously enables both vapor-deposition procedures to be undertaken during the same manufacturing step.

For further enhancing the selectivity, the filter layer can still be optimized in an additional vapor-deposition process subsequent to the process for applying the beam-splitter layer. It can be optimized based on the measure of the angle of incident of the light beam conducted in the reception optical fiber. Alternatively, however, the separating module itself can also be designed such that in a further development of the invention the back end face of the reception optical fiber also extends parallel to the beam-splitter layer. This produces the advantage that given a beam-splitter layer optimizing proceeding from the vapor-deposition process step, the filter layer which is vapor-deposited in the

DESCRIPTION OF THE PREFERRED EMBODIMENTS

Figure 1:
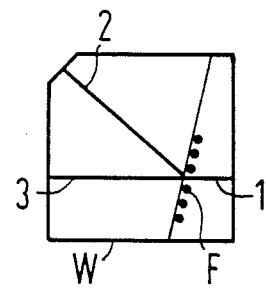
FIG. 1 is a schematic presentation of an optical separating module or WDM coupler having a known structure.

FIG. 1 schematically illustrates a known optical separating module such as a WDM coupler W which has three optical fibers 1, 2 and 3. The optical fibers or waveguides 1 and 3 are aligned to lie on the same optical axis and are separated from one another by a wavelength-selective beam-splitting layer F which is arranged at an angle relative to the common axis, which angle is illustrated as being greater than 45°. The fiber 2, which is an additional or third waveguide, extends at an angle to the waveguide 3 which angle is less than 90° and has its axis intersect the common axis of the waveguides 1 and 2 at the plane of the beam-splitter layer F. The angle between the waveguide 2 is such to receive any light traveling in the waveguide or fiber 3 that is reflected by the beam-splitter F. The beam-splitter layer F can be a wavelength-selective interference filter composed of a plurality of SiO$_2$ and TiO$_2$ layers. This interference filter has been vapor-deposited on a slanting end face of the optical fiber 2 in a high vacuum in the course of a manufacturing process which will become clear from a few of the process steps shown in FIG. 2.

Figure 2A:
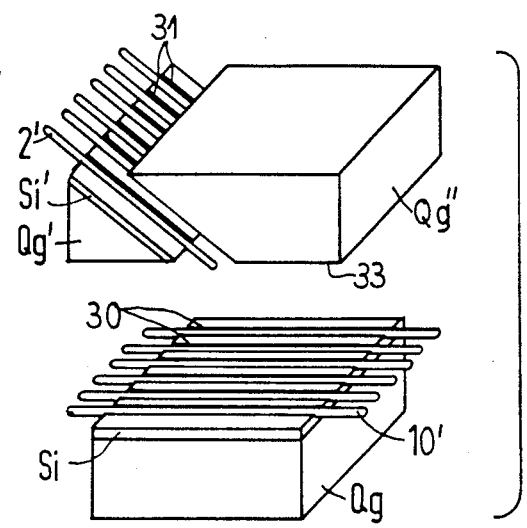
FIGS. 2a, 2b and 2c illustrate these steps in manufacturing the optical separation modules illustrated in FIG. 1.
Figure 2B:
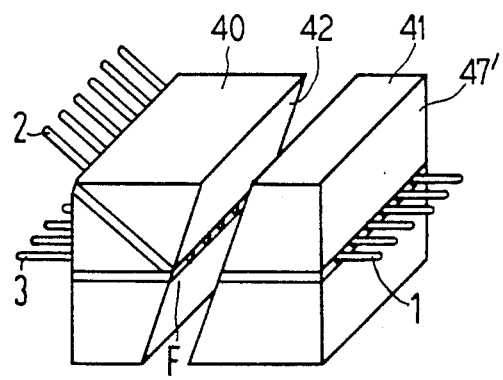
Figure 2C:
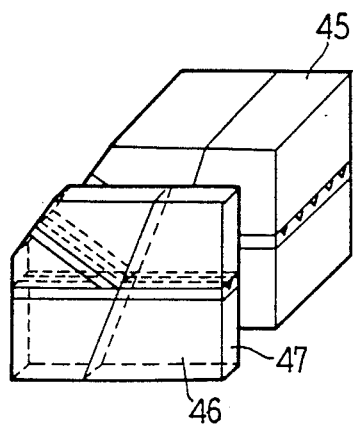

As illustrated in FIG. 2, optical waveguides or fibers 10' are inserted in V-shaped grooves 30 in either a silica glass prism or cuboid Qg or as illustrated in a silicon wafer Si which is glued to the cuboid Qg. In a similar manner, fibers 2' were placed in grooves 31 in a silicon layer Si' which is on a triangular glass prism-like block Qg'. These fibers 2' were covered by a third block Qg'' which is joined thereto to form a subassembly. The subassembly has a surface 33 finished and polished so that the subassembly can be secured onto the block Qg having the fibers 10 to form a unit. This unit is then subdivided into two parts 40 and 41 as illustrated in FIG. 2b with the cut passing through the intersection of the fibers 2 and 10'. The cutting of the part into two parts 40 and 41 causes the fibers 10' to become first fibers 3 in the part 40 and second fibers 1 in the part 41. The cut faces are then polished and an interference filter F is then vapor-deposited on this polished surface 42 of the part 40. Subsequent to creating the interference filter on the surface 42, the two parts 40 and 41 are then adjusted relative to one another and are then glued together to form a block 45 of FIG. 2c. An optical separating module such as 46 (FIG. 2c) can be subsequently cut by cutting in a plane extending parallel to the planes of the fibers 1, 2 and 3.

It should be noted that the procedure being utilized up to this point and the particular coupler 46 is substantially the same as produced by the method described in the above-mentioned patent application, Ser. No. 246,100, U.S. Pat. No. 4,637,682, whose disclosure is incorporated herein by reference thereto.

Figure 3:
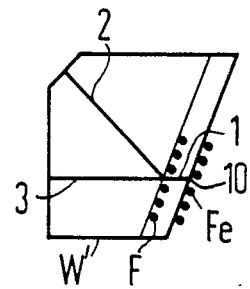
FIG. 3 is a schematic presentation of an optical separating module or WDM coupler of the present invention.

A filter layer Fe can then be applied on a surface 47 or the block can be further shaped to provide an end surface 10 of the module W' of FIG. 3. The filter layer Fe is applied to this end surface 10 which is an optical fiber end surface of an optical fiber 1 which will be coupled to an optical electrical transducer or a reception module. The filter layer Fe will have a transmission characteristic which corresponds to that of the beam-splitter layer F of the separating module W'. Just like the beam-splitter F, this filter layer Fe can be vapor-deposited whereas the vapor-deposition of the beam-splitter layer F onto the part 40 of FIG. 2b and the vapor-depositing of the filter layer Fe onto a polished end surface such as 47' of FIG. 2b are carried out in one and the same production step so that the same sequence and thickness of individual dielectric layers of SiO$_2$ and TiO$_2$ are achieved for the filter layer Fe and also for the beam-splitting layer F during the manufacturing sequence illustrated in FIGS. 2a, 2b and 2c.

The beam-splitter layer is usually dimensioned so that the transmission of one light beam and the reflection of another light beam are optimized given the angle of light incidence or the mean angle which is established at the layer. A corresponding optimization of the transmission of the one light beam in the filter layer Fe is achieved in that as may likewise be seen from FIG. 3, the optical fiber end face 10 which carries the filter layer Fe proceeds to extend parallel to the beam-splitting layer F. For this purpose, the manufacturing process illustrated in FIGS. 2a, 2b and 2c is modified as illustrated in FIGS. 4a, 4b and 4c.

Figure 4A:
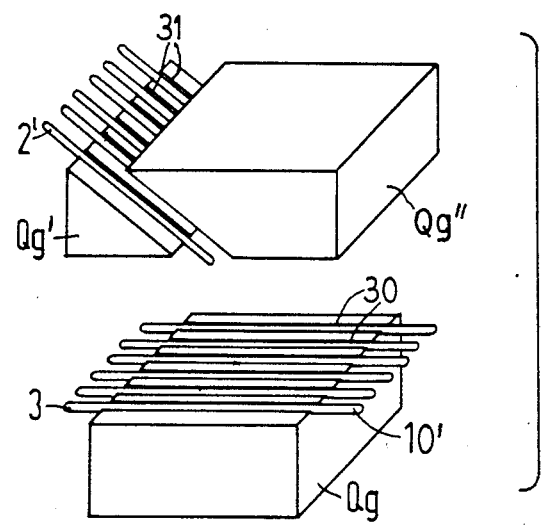
FIGS. 4a, 4b and 4c illustrate a few of the manufacturing steps for producing the module of FIG. 3 in accordance with the present invention.
Figure 4B:
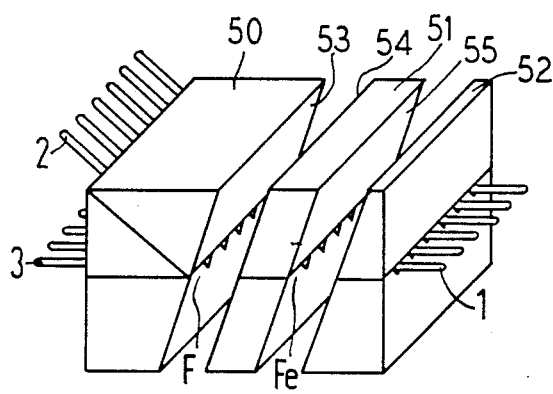
Figure 4C:
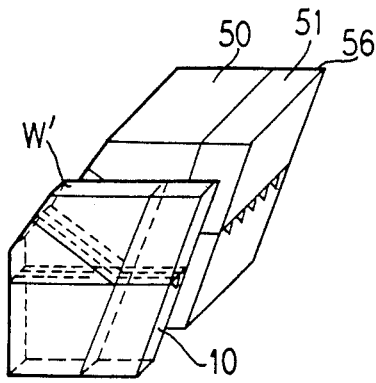

As illustrated in FIG. 4a, a block Qg with V-shaped grooves 30 has a plurality of fibers 10' arranged thereon. A second prism-like block Qg' has grooves 31 which receive fibers 2' which is then covered by joining a block or prism-shaped block Qg''. After joining the blocks Qg' and Qg'' together, the bottom surface is polished and then this composite is assembled onto the block Qg. In the next step, as illustrated in FIG. 4b, the joined group of blocks are subdivided into three parts which are the parts 50, 51 and 52 by two cuts which extend parallel to each other. The first part 50 has its cut surface 53 polished and the second part 51 has both cut surfaces 54 and 55 polished and then the cut surface 53 of the part 50 and the surface 55 of the part 51 after being polished have the interference filter forming the beam-splitting F applied to the surface 53 while the filter layer Fe is formed or vapor-deposited on the surface 55. By forming both the interference or beam-splitter layer F and the filter layer Fe during the same vapor-depositing steps, they will have identical transmission characteristics. Subsequent to forming or depositing layers F and Fe, the parts 50 and 51 are joined together with the optical fibers of the part 51 aligned with the optical fibers 3 of the part 50 to form a block or unit 56 of FIG. 4c from which individual units such as W' of FIG. 3 can be separated therefrom by cutting the block 56 in a plane parallel to the planes of the fibers 1, 2 and 3 and between two adjacent fiber planes.

Figure 5:
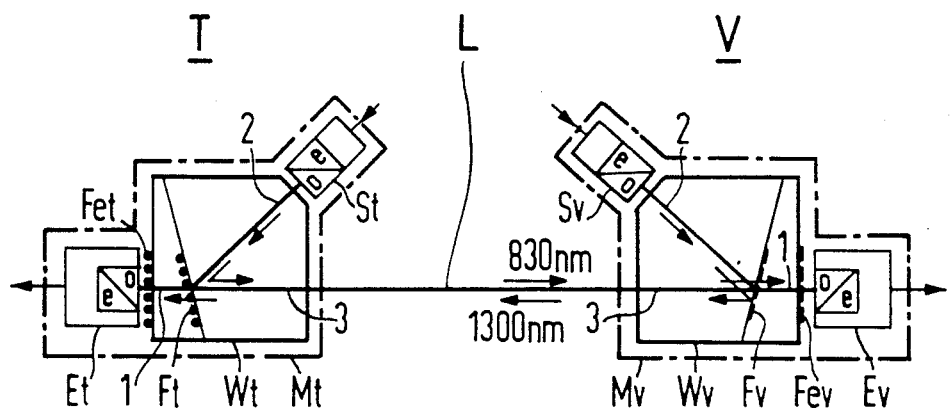
FIG. 5 schematically illustrates a bidirectional light waveguide transmission system having an optical separating module at each end in accordance with the present invention.
Figure 6:
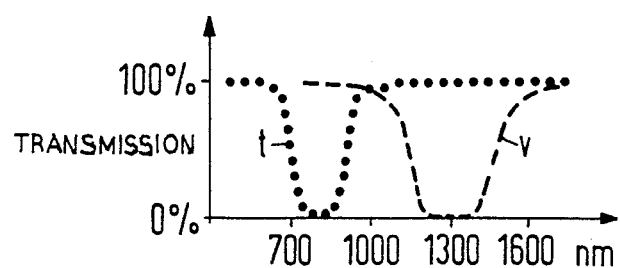
FIG. 6 is a graph illustrating the relation of the percentage of light transmission relative to the wavelength.

Each of the optical separation modules WDM couplers can be especially employed in a light waveguide transmission system such as schematically illustrated in FIG. 5. In the system of FIG. 5, a light waveguide link L operates to interconnect a bidirectional wavelength division multiplex, electro-optical transmission-reception module Mt to a similar module Mv. The module Mt is provided at the end T whereas the module Mv is provided at the end V. The module Mt has a transmission module St, which is an electro-optical transducer and will couple light into an optical fiber 2 of the separating module Wt. In a similar way, a transmission module Sv will couple light into the waveguide 2 of the separating module Wv. As illustrated, each of the fibers 2 is adjacent a first fiber 3 so that light reflected by the beam-splitter Ft will be coupled or reflected back into the first waveguide 3 of the module Wt while light reflected by the beam-splitter Fv will be reflected back into the waveguide 3 of the module Wv. The second waveguide 1 of each of the modules is connected to a reception module with the waveguide 1 of the module Wt being connected to a reception module Et and the second waveguide 1 of the module Wv connected to the reception module Ev. Both of the reception modules are likewise opto-electric transducers and it is noted that the second waveguide 1 of each of the modules Wv and Wt are optically aligned with the first waveguide 3 of the respective module.

The module Mt has its transmission module St coupling light of a wavelength of 830 nm into the fiber 2 and the beam-splitter Ft as well as the filter Fet have a maximum transmission characteristic as illustrated by the curve t at a wavelength of approximately 1300 nm and a maximum reflective characteristic at a wavelength of approximately 830 nm. Thus, light from the transmission module St will be reflected by the beam-splitter Ft into the fiber 3 to be conveyed by the linking fiber L to the unit Wv. The beam-splitter Fv and the filter Fev have transmission characteristics shown by the curve v which have a substantially maximum reflection for a wavelength of 1300 nm and a maximum transmissiveness for wavelengths in the range of 830 nm. Thus, the signal in a wavelength of 830 will pass through the beam splitter Fv and the filter Fev to be received by the opto-electronic transducer forming the receiver Ev. The transmitter Sv operates in a wavelength of approximately 1300 nm and the light coupled into the additional waveguide 2 will be reflected by the beam-splitter Fv into the first waveguide 3 to be coupled to the link L to be carred to the unit or module Wt. This light of a wavelength of 1300 nm will be passed by the beamsplitter Ft and the filter Fet to the receiver Et.

The formation of the filter layers of the beam-splitting layer with the said optical properties is achieved by the vapor-deposition of the layers in a vacuum. By proper selection of sequence and thickness of the dielectric layers of $SiO_2$ and $TiO_2$, the desired wavelength selectivity can be obtained during the manufacturing sequence as discussed with regard to FIG. 4. Thus, the particular module such as Wt has two layers Ft and Fet which are very transmissive to light in a wavelength range of 1300 nm but are highly reflective for light of a wavelength of 830 nm. In an analogous manner, the module Wv has a beam-splitter Fv and a filter Fev, which are highly transmissive to light in a wavelength of 830 nm but highly reflective to light in a wavelength of 1300 nm.

Although various minor modifications may be suggested by those versed in the art, it should be understood that we wish to embody within the scope of the patent granted hereon, all such modifications as reasonably and properly come within the scope of our contribution to the art.

We claim:

1. In an optical separating module having a first optical fiber and second optical fiber aligned on a common axis and separated from one another by a wavelength selective beam-splitter layer arranged to extend obliquely with respect to the common axis, said module having an additional third optical fiber which extends obliquely relative to the aligned first and second fibers and has its axis intersecting the common axis in the plane of the wavelength selective beam-splitter and being aligned in a reflective direction of the beam-splitter to receive light reflected from the first fiber, the improvements comprising a filter layer having a transmission characteristic corresponding to the transmission characteristic of the beam-splitter layer being applied to the optical fiber end face of the second fiber, both said filter layer and the wavelength selective beam-splitter being formed of a plurality of layers vapor deposited in one and the same manufacturing step to have the same sequence, composition, and thickness, and said second optical fiber being adapted for connection to an optical electrical transducer for a reception module.

2. In an optical separating module having a first optical fiber and second optical fiber aligned on a common axis and separated from one another by a wavelength selective beam-splitter layer arranged to extend obliquely with respect to the common axis, said module having an additional third optical fiber which extends obliquely relative to the aligned first and second fibers and has its axis intersecting the common axis in the plane of the wavelength selective beam-splitter and being aligned in a reflective direction of the beam-splitter to receive light reflected from the first fiber, the improvements comprising a filter layer having a transmission characteristic corresponding to the transmission characteristic of the beam-splitter layer being applied to the optical fiber end face of the second fiber, said end face of the second fiber having the filter extending parallel to the beam-splitter layer, both said filter layer and the wavelength selective beam-splitter being formed of a plurality of layers vapor deposited in one and the same manufacturing step to have the same sequence, composition, and thickness, and said second optical fiber being adapted for connection to an optical electrical transducer for a reception module.

3. A method of forming an optical separating module having first and second fibers aligned on a common axis and separated by an obliquely extending wavelength-selective beam-splitter layer, a third fiber extending at an angle to the aligned fibers and intercepting the common axis of the aligned fibers in the plane of the beam-splitting layer and a filter layer on an end face of the second fiber, said method comprising the steps of providing a first body having a groove on a surface receiving an optical fiber, providing a second body having a first face extending at an angle to a second face and having a groove receiving another fiber, then covering the fiber in the groove of the second body by a third body, joining the second and third bodies together to form a subassembly, polishing the second face and fiber, then assembling the subassembly on the first body with the second fiber in alignment with the fiber of the first body, joining the subassembly and first body together to form a unit, subsequently cutting the unit with a first cut in a plane extending at an angle to the fibers in the unit and intersecting the junction of the fibers of the unit to form a first part having a first surface and a second part having a second surface, cutting the second part with a second cut extending parallel to the first cut and second surface to form a third surface on the second part extending parallel to the second surface, polishing the first, second and third surfaces, then simultaneously applying a wavelength-selective layer on the polished first surface and third surface by vapor-depositing at the same time a series of alternate materials, subsequently joining the first and second parts with the polished second surface engaging the layer on the first surface and the fiber of the second part being aligned with the fiber of the first part.

4. A method of forming an optical separating module having first and second fibers aligned on a common axis and separated by an obliquely extending wavelength-selective beam-splitter layer, a third fiber extending at an angle to the aligned fibers and intercepting the common axis of the aligned fibers in the plane of the beam-splitting layer and a filter layer on an end face of the second fiber, said method comprising the steps of providing a first body having a groove on a surface receiving an optical fiber, providing a second body having a first face extending at an angle to a second face and having a groove receiving another fiber, then covering the fiber in the groove of the second body by a third body, joining the second and third bodies together to form a subassembly, polishing the second face and fiber, then assembling the subassembly on the first body with the second fiber in alignment with the fiber of the first body, joining the subassembly and first body together to form a unit, subsequently cutting the unit in a plane extending at an angle to the fibers in the unit and intersecting the junction of the fibers of the unit to form a first part having a first surface and a second part having a second and third surface, polishing the first, second and third surfaces, then simultaneously and applying a wavelength-selective layer on the polished first surface and third surface by vapor-depositing at the same time a series of alternate materials, subsequently joining the first and second parts with the polished second surface engaging the layer on the first surface and the fiber of the second part being aligned with the fiber of the first part.

5. In a method according to claim 4, which includes, prior to applying the filter layer, enhancing the selectivity of the filter layers by processing the third surface to have the desired angle of incidence for the radiation being conducted in the second fiber.

* * * * *